United States Patent
Köhn et al.

(10) Patent No.: US 11,148,894 B2
(45) Date of Patent: Oct. 19, 2021

(54) METHOD AND DEVICES AND SYSTEM FOR WINDING AND UNWINDING A REEL

(71) Applicant: Windmöller & Hölscher KG, Lengerich (DE)

(72) Inventors: Uwe Köhn, Osnabrück (DE); Oliver Huil, Osnabrück (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 15/956,590

(22) Filed: Apr. 18, 2018

(65) Prior Publication Data

US 2018/0305158 A1     Oct. 25, 2018

(30) Foreign Application Priority Data

Apr. 21, 2017   (DE) ...................... 10 2017 108 496.7

(51) Int. Cl.
*B65H 18/14*     (2006.01)
*B65H 26/02*     (2006.01)

(52) U.S. Cl.
CPC ............ *B65H 18/145* (2013.01); *B65H 26/02* (2013.01); *B65H 2301/414* (2013.01);
(Continued)

(58) Field of Classification Search
CPC .......... G05B 19/41875; G05B 23/0254; G05B 23/024; G05B 2219/32187;
(Continued)

(56) References Cited

U.S. PATENT DOCUMENTS 3,782,650 A  *  1/1974  Donnell, Jr. ....... B65H 19/2223
                                                  242/521
5,390,470 A  *  2/1995  Brunini .................. B65H 21/02
                                                   53/168
(Continued)

FOREIGN PATENT DOCUMENTS

DE           19882374 B4      4/2006
DE       102009029082 A1      3/2011
(Continued)

OTHER PUBLICATIONS

Office Action for German application No. 10 2017 108 496.7 dated Dec. 15, 2017, with an English summary, 9 pages.
(Continued)

*Primary Examiner* — Darrin D Dunn
(74) *Attorney, Agent, or Firm* — Rudy J. Ng; Bret E. Field; Bozicevic, Field & Francis LLP

(57) ABSTRACT

The invention relates to a monitoring method (100) for monitoring a winding process on a winding device (1), comprising: providing (104) a correlation of an irregularity (12) of a web material (11) to a running parameter (13) of the reel (10) for an unwinding process. The invention further relates to a control method (200) for performing an unwinding process on an unwinding device, comprising: obtaining (201) a correlation of an irregularity (12) of a web material (11) to at least one running parameter (13) of a reel (10) from a winding process. Furthermore, the invention relates to a processing method (300) for performing a process of processing a web material (11). Furthermore, the invention relates to a winding device (1) for performing a winding process of a web material (11) to a reel (10), an unwinding device (2) for performing an unwinding process of a web material (11) of a reel (10) and a processing system (3) for processing a web material (11).

19 Claims, 4 Drawing Sheets

Figure 1:
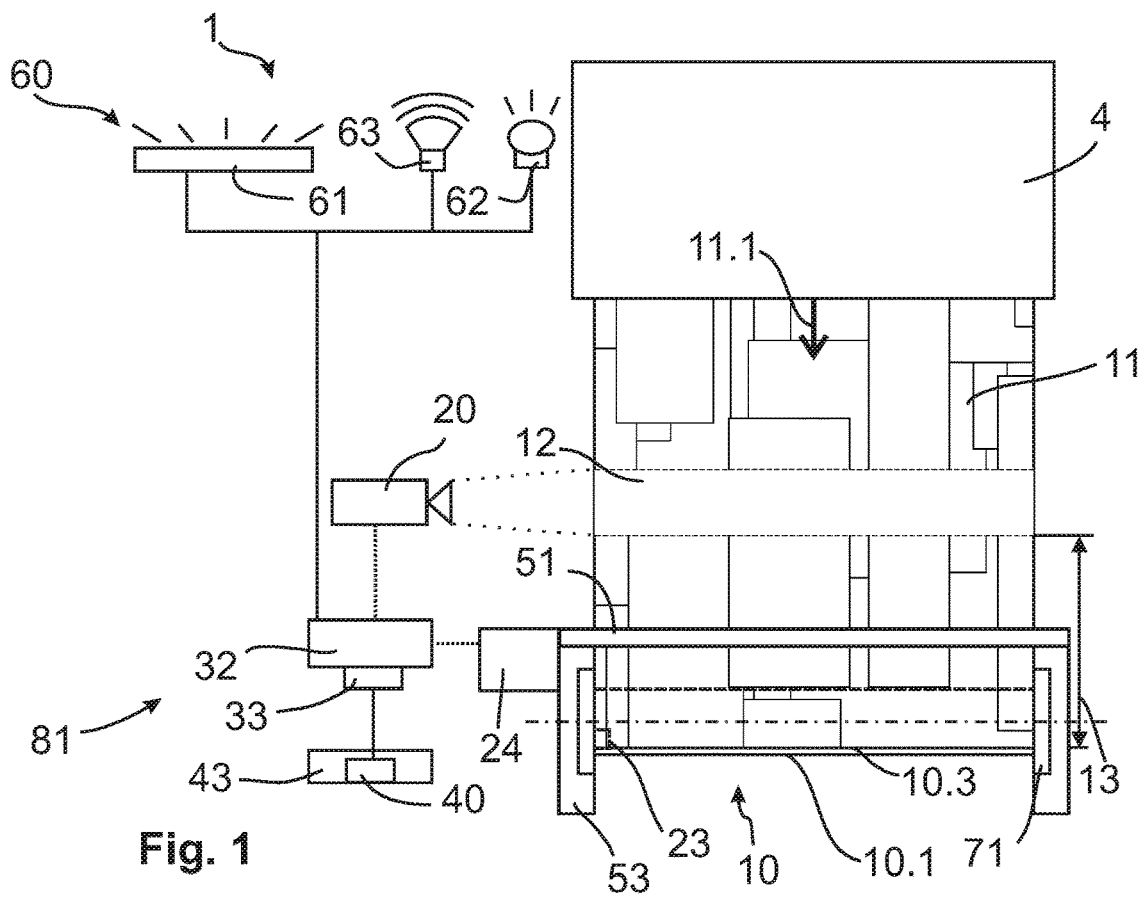

(52) U.S. Cl.
  CPC .... *B65H 2301/542* (2013.01); *B65H 2553/42* (2013.01); *B65H 2553/52* (2013.01); *B65H 2557/60* (2013.01); *G05B 2219/32179* (2013.01); *G05B 2219/32198* (2013.01); *G05B 2219/32204* (2013.01)

(58) Field of Classification Search
  CPC ...... G05B 2219/32221; G05B 23/0229; G05B 2219/31477; G05B 2219/32057; G05B 2219/32128; G05B 2219/32179; G05B 23/0267; Y02P 90/22; Y02P 90/14; B65H 26/02; B65H 2220/01; B65H 18/08; B65H 2557/62; G06F 17/18; G06F 11/3452; G06F 11/0721; G06F 11/0751; G06F 11/079
  See application file for complete search history.

(56) References Cited

U.S. PATENT DOCUMENTS

| | | | | |
|---|---|---|---|---|
| 5,524,413 | A * | 6/1996 | Fukuda | B65B 9/20 226/100 |
| 5,971,315 | A * | 10/1999 | Kojo | B65H 18/08 242/534.2 |
| 6,009,421 | A * | 12/1999 | Xie | G06F 11/25 706/61 |
| 6,098,063 | A * | 8/2000 | Xie | G06N 5/025 706/60 |
| 6,299,730 | B1 * | 10/2001 | Broek | B65H 26/02 162/198 |
| 6,606,947 | B2 * | 8/2003 | Frossard | B41F 33/0036 101/171 |
| 8,676,538 | B2 * | 3/2014 | Purdy | G05B 23/0221 438/14 |
| 8,740,061 | B2 * | 6/2014 | Fisher | G05B 19/41875 235/375 |
| 9,778,626 | B2 * | 10/2017 | Nixon | G05B 11/01 |
| 10,037,026 | B2 * | 7/2018 | Shinkle | G05B 23/0232 |
| 10,152,031 | B2 * | 12/2018 | Nixon | G05B 11/01 |
| 2001/0039892 | A1 * | 11/2001 | Frossard | B41F 33/0036 101/228 |
| 2002/0166970 | A1 * | 11/2002 | Komulainen | D21G 9/0027 250/340 |
| 2003/0010422 | A1 * | 1/2003 | Starkey | B31F 5/06 156/157 |
| 2003/0225466 | A1 * | 12/2003 | Yulevitch | G06K 9/6284 700/80 |
| 2004/0019461 | A1 * | 1/2004 | Bouse | G05B 23/0229 702/188 |
| 2004/0051059 | A1 * | 3/2004 | Ungpiyakul | A61F 13/15772 250/559.29 |
| 2005/0027656 | A1 * | 2/2005 | Tobler | G06Q 10/06 705/53 |
| 2005/0125710 | A1 * | 6/2005 | Sanghvi | G06F 11/0754 714/39 |
| 2005/0141760 | A1 * | 6/2005 | Floeder | G01N 21/89 382/141 |
| 2005/0144094 | A1 | 6/2005 | Floeder et al. | |
| 2005/0146709 | A1 * | 7/2005 | Oh | H01J 37/32935 356/72 |
| 2006/0090319 | A1 * | 5/2006 | Howe | G01N 21/8903 29/407.05 |
| 2006/0222430 | A1 * | 10/2006 | Duckett | B41J 3/4075 400/583 |
| 2006/0249620 | A1 * | 11/2006 | Huil | B65H 23/00 242/563.2 |
| 2007/0127934 | A1 * | 6/2007 | Shoji | G06K 15/408 399/9 |
| 2007/0250292 | A1 * | 10/2007 | Alagappan | C10B 55/00 702/184 |
| 2008/0082308 | A1 * | 4/2008 | Kant | G05B 23/021 703/12 |
| 2008/0183427 | A1 * | 7/2008 | Miller | G05B 23/024 702/183 |
| 2008/0243434 | A1 * | 10/2008 | Boutin | B65B 57/00 702/179 |
| 2009/0062933 | A1 * | 3/2009 | Eryurek | G05B 23/0264 700/12 |
| 2009/0088889 | A1 | 4/2009 | Hellstrom et al. | |
| 2009/0093893 | A1 * | 4/2009 | Miller | G05B 23/0254 700/30 |
| 2009/0101746 | A1 * | 4/2009 | Lanz | B65H 18/26 242/534 |
| 2009/0185204 | A1 * | 7/2009 | Wu | H04N 1/60 358/1.9 |
| 2009/0250544 | A1 * | 10/2009 | Pasquale | B65H 19/286 242/527 |
| 2009/0259332 | A1 * | 10/2009 | Lee | G05B 13/0275 700/110 |
| 2009/0276078 | A1 * | 11/2009 | Sugamoto | G05B 19/41875 700/121 |
| 2009/0276475 | A1 * | 11/2009 | Ramsey | H04L 63/083 |
| 2009/0308028 | A1 * | 12/2009 | Koelker | B65B 65/003 53/450 |
| 2009/0313198 | A1 * | 12/2009 | Kudo | G06F 11/0709 706/47 |
| 2010/0090363 | A1 * | 4/2010 | Larsen | B29C 70/504 264/171.23 |
| 2010/0241399 | A1 * | 9/2010 | Kavaklioglu | C10G 11/187 702/179 |
| 2010/0304062 | A1 * | 12/2010 | Daviknes | B32B 27/32 428/35.2 |
| 2010/0318934 | A1 * | 12/2010 | Blevins | G05B 13/048 715/772 |
| 2011/0099114 | A1 * | 4/2011 | Lehrieder | G06Q 10/103 705/301 |
| 2011/0136639 | A1 * | 6/2011 | Hilling | B65B 1/02 493/87 |
| 2011/0245956 | A1 * | 10/2011 | Matsushita | G05B 19/41875 700/110 |
| 2011/0248084 | A1 * | 10/2011 | Rademacher | G06K 7/0008 235/440 |
| 2011/0295545 | A1 * | 12/2011 | Kant | G05B 23/021 702/130 |
| 2012/0075659 | A1 * | 3/2012 | Sawada | G03G 15/5058 358/1.14 |
| 2012/0167739 | A1 * | 7/2012 | Lewis | B26D 5/00 83/663 |
| 2013/0069792 | A1 * | 3/2013 | Blevins | G05B 17/02 340/815.4 |
| 2013/0080372 | A1 * | 3/2013 | Ho | G06N 5/02 706/50 |
| 2013/0173332 | A1 * | 7/2013 | Ho | G06Q 10/06 705/7.27 |
| 2013/0304235 | A1 * | 11/2013 | Ji | G05B 13/048 700/29 |
| 2014/0008426 | A1 * | 1/2014 | Fisher | G05B 19/41875 235/375 |
| 2014/0230846 | A1 * | 8/2014 | Dudley | H01L 21/02096 134/4 |
| 2014/0282257 | A1 * | 9/2014 | Nixon | G05B 11/01 715/835 |
| 2014/0338287 | A1 * | 11/2014 | Pelagatti | B65B 35/50 53/202 |
| 2014/0365179 | A1 * | 12/2014 | Horowitz | G05B 23/0254 702/185 |
| 2015/0090140 | A1 * | 4/2015 | Rancourt | B41F 7/04 101/219 |
| 2015/0292155 | A1 | 10/2015 | Bomstad et al. | |
| 2015/0324329 | A1 * | 11/2015 | Blevins | G05B 17/02 703/2 |
| 2016/0091397 | A1 * | 3/2016 | Shinkle | G05B 23/0232 702/35 |
| 2016/0132046 | A1 * | 5/2016 | Beoughter | G05B 19/4184 700/17 |
| 2016/0379896 | A1 * | 12/2016 | Asakura | H01J 37/32972 156/345.24 |
| 2017/0102694 | A1 * | 4/2017 | Enver | G05B 19/41875 |

(56) References Cited

U.S. PATENT DOCUMENTS

| | | | | |
|---|---|---|---|---|
| 2017/0103103 A1* | 4/2017 | Nixon | ............... | G06F 16/256 |
| 2017/0132724 A1* | 5/2017 | Aqlan | ............... | G06Q 50/04 |
| 2017/0261403 A1* | 9/2017 | Hiruta | ............ | G05B 23/0216 |
| 2017/0302171 A1* | 10/2017 | Goto | .................. | G05B 15/02 |
| 2017/0308049 A1* | 10/2017 | Fujii | ................ | G05B 19/0426 |
| 2017/0310562 A1* | 10/2017 | Jin | ....................... | H04B 3/46 |
| 2018/0059656 A1* | 3/2018 | Hiruta | ................ | G05B 23/02 |
| 2018/0141282 A1* | 5/2018 | Jorda Boldu | ......... | B65B 51/32 |
| 2018/0305159 A1* | 10/2018 | Kohn | .................. | B21B 38/04 |
| 2018/0314573 A1* | 11/2018 | Chang | ............... | G06F 11/079 |
| 2018/0356151 A1* | 12/2018 | Suraganda Narayana | ............... | |
| | | | | F25J 1/0256 |
| 2019/0010005 A1* | 1/2019 | Ramakrishnan | ....... | B65H 26/02 |

FOREIGN PATENT DOCUMENTS

| | | | |
|---|---|---|---|
| DE | 102009029083 A1 | | 3/2011 |
| DE | 102009029084 A1 | | 3/2011 |
| DE | 102014005347 A1 | | 10/2015 |
| DE | 102015208126 A1 | | 11/2016 |
| DE | 102015213709 A1 | | 1/2017 |
| EP | 2206666 A1 | | 7/2010 |
| WO | WO2001010759 A1 | * | 8/1999 |

OTHER PUBLICATIONS

Extended European Search Report for European Application No. 18168612.2 dated Sep. 26, 2018, with an English summary, 10 pages.

Examination Report for European Application No. 18168612.2 dated Apr. 17, 2020, with its English summary, 8 pages.

* cited by examiner

METHOD AND DEVICES AND SYSTEM FOR WINDING AND UNWINDING A REEL

The present invention relates to a monitoring method for monitoring a winding process, a control method for performing an unwinding process, and a processing method for performing a process of processing a web material. Furthermore, the invention relates to a winding device for performing a winding process of a web material, an unwinding device for performing an unwinding process of a web material and a processing system for processing a web material.

In order to convey a continuous material, such as a manufactured film, in the distribution or to the place of use, the material is often portioned and provided in the form of reels. Such reels are usually first wound onto a winding device in order to be correspondingly unwound at the place of use by an unwinding device, such that the material can be further processed there. The unwinding is often followed by the following further processing processes: for example, the generation of plastic sacks, the wrapping of stacked packaged goods for load securing or the like. However, it may happen that the continuous material has certain defects or irregularities which make further processing impossible or at least cause quality losses.

From the prior art it is therefore known to detect such defects already during a winding process and to react directly during the winding process by, for example, stopping the winding process, separating a web material which is wound onto a reel and thus closing the reel. The part of the web material with the defect is then completely removed from the process and a new reel sleeve is mounted on the winding device, so that another reel can be generated. Thereby the disadvantage is that, accordingly, the reel, in which the defect has been found, may be smaller than originally provided. This means that it carries less web material, since it was completed early. Furthermore, the modification of the winding device is complex. The subsequent process of unwinding the reels is also affected. If the undersized reel can be sold at all, it also generates additional set-up times in the case of an unwinding process, since accordingly, an unwinding device undergoes a change of the reels more often.

It is an object of the present invention to at least partially overcome the foregoing disadvantages known from the prior art. In particular, it is an object of the present invention to improve the handling of defective web material, so that the consequential costs can be minimized and/or the processability of the defective web material can be at least partially preserved.

The above object is achieved by a monitoring method for monitoring a winding process according to the present disclosure, a control method for performing an unwinding process according to the present disclosure, a processing method for performing a process of processing according to the present disclosure, a winding device for performing a winding process according to the present disclosure, an unwinding device for performing an unwinding process according to the present disclosure, and a processing system for processing a web material according to the present disclosure.

Further features and details of the invention will become apparent from the dependent claims, the description and the drawings. In this case, features and details that have been described in connection with the monitoring method according to the invention apply, of course, also in connection with the inventive control method and/or the inventive processing method and/or the inventive winding device and/or the inventive unwinding device and/or the inventive processing system and in each case vice versa, so that mutual reference is or can always be made with respect to the disclosure of the individual inventive aspects.

According to a first aspect of the invention, the monitoring method for monitoring a winding process on a winding device comprises the following steps:
- at least partially winding of a web material into a reel,
- detecting at least one irregularity of the web material,
- determining a correlation of the irregularity to at least one running parameter of the reel,
- providing the correlation of the irregularity of the web material to the running parameter of the reel for an unwinding process.

The reel may preferably be stored on a sleeve holder during the winding. In this case, the reel preferably has a reel sleeve, which is wrapped with at least a portion of the web material during the winding process. During winding, the web material is thereby increased on the reel. Preferably, prior to winding, a production of the web material may occur. In particular, the web material may comprise a plastic film. Thus, plastic films have a complex production process in which, if necessary, many parameters have to be taken into account, so that an exchange of information between individual processes in the case of plastic films is particularly advantageous. Alternatively, however, other materials are conceivable. The detection of the at least one irregularity of the web material can advantageously be performed by a sensor or computational. For example, a detection unit may be provided by which an irregularity is detected. In particular, the irregularity can be detected optically and/or acoustically. For example, the detection unit can be configured to detect the irregularity by means of ultrasound or can have a camera. An electronic detection of the irregularity is also conceivable, for example, by measuring a required current of a driving means or the like. An irregularity may, in particular, be understood as a critical or uncritical feature in the processing process during the unwinding process. Thus, the irregularity may comprise a defect of the web material. In particular, the irregularity may comprise at least one of the following features:
- unsuccessful opening of a tube of the web material,
- at least partial tearing of the web material,
- absence of a printed image on the web material,
- increased slip on a driving means during winding of the web material,
- changed torques and/or forces during the winding of the web material,
- blocking in the web material, in particular in a tubular web material,
- temporary deviation from a production formulation, in particular film formulation, of the web material,
- exceeding or falling below specifications of physical characteristics of the web material.

Thus, the irregularity may directly or indirectly affect the web material. In particular, the irregularity can be recognized by the fact that during the winding process, a data comparison with a production process of the web material occurs, so that a change in the production process, for example concerning the production formulation, suggests a change in the web material at the position of the running parameter. It is also conceivable that the web material is wound up as a tube, which is opened during unwinding or after unwinding, so that a three-dimensional shape arises from a previously folded tube. Recognized blockings in the tubular web material can cause the opening to be impossible or only possible under difficult conditions. Furthermore, the web material can be printed with a printed image, in particular before it is wound up. If a portion of this printed image is missing, for example because of missing color in a printer unit, this can already be detected as an irregularity during winding. A changed slip during winding of the web material may also mean that a driving means, which ensures a propulsion of the web material, at least partially slips. The speed of the driving and the speed of the web material differ accordingly. Furthermore, forces and/or torques can be measured at different positions of the winding process, which can be an indicator of the occurrence of an irregularity. Furthermore, a specification of physical characteristics of the web material, in particular a film, during the production of the web material can be exceeded or fallen below of. This can lead to the fact that the web material, for example, during processing to sacks does not withstand this processing and a corresponding sack tears. The physical characteristics of the web material may preferably comprise stress-strain characteristics, in particular elasticity, of the web material.

The running parameter may preferably also be referred to as a running meter. Thus, the running parameter may in particular comprise the actually wound length of the web material on the reel until the occurrence of the irregularity. The length can be related to the irregularity in different ways, that is, it can be correlated. Thus, the running parameter may comprise a length ranging from the starting position of the web material, that is in particular the first wound end of the web material, to the beginning of the irregularity, to the end of the irregularity or to an average value between the beginning and the end of the irregularity. In particular, the correlation of the irregularity to the running parameter can thus be understood as an assignment of a specific value of the running parameter to a position of the irregularity relative to the reel and/or vice versa. In particular, the running parameter is accordingly also correlated or interdependent on the irregularity. For example, if the irregularity detects the absence of a printed image, the running parameter may comprise the length from the beginning of the winding of the web material to the beginning of the absence of the printed image and/or the end of the absence of the printed image. Further, the running parameter may comprise, for example, an unwinding length of a web material to be unwound until the irregularity occurs. In particular, the unwinding length corresponds to the total length of the web material of the finished reel minus the already wound length. The correlation between the irregularity and the running parameter may thus comprise relating the irregularity and the running parameter. This can be done, for example, by providing a table having at least two columns, the irregularity being written into the first column of the table and the running parameter being written to the second column of the table so that it can be traced back or assigned to which position in the reel the irregularity has occurred. Providing the correlation between the irregularity and the running parameter of the reel for an unwinding process can be performed, for example, by printing out and/or displaying the previously described table. However, other forms of provision are conceivable. In particular, a field variable of a computer program may be provided instead of the table or provide the table.

By the monitoring method according to the invention, it is thus possible to indicate the position of the irregularity in the reel. This allows to be able to react to the irregularity during an unwinding process of the reel. The correlation between the irregularity and the running parameter provides a high accuracy for finding this position, since the running parameter is at least substantially independent of a thickness of the web material and/or a diameter of the reel. Thus, it can happen, in particular in the production process of films, that a nominal thickness of the film deviates upwards and thus a conclusion of a reel diameter to an actual length of the unwound web material can be subject to errors. Due to the fact that the position of the irregularity in the reel is known during the unwinding process, it can thus be reacted correspondingly during the unwinding process, so that even a reel with a defective position is still salable and does not require a complete modification during the unwinding process.

Rather, it can be decided during unwinding, for example, whether the irregularity is still processable or whether a portion of the web material is to be removed. Thus, the material requirement can be reduced overall. The monitoring method may further comprise the following step:

evaluating the correlation of the irregularity to the running parameter.

The evaluation can be used to estimate the severity of the irregularity based on given criteria. This evaluation can also be provided to the unwinding process. In particular, the evaluation and the provision of the evaluation can also be performed automatically, so that a reproducible accuracy of the method is supported.

In the context of the invention, it is also conceivable that the running parameter of the reel is determined during the winding of the web material. Preferably, the running parameter can be determined continuously during the winding of the web material. Determining the running parameter may comprise direct measurement. The running parameter can thus be continuously recorded, for example, during winding, so that a value corresponding to the irregularity is directly available when the irregularity is detected. Alternatively, the running parameter can also be detected non-continuously during unwinding, for example by measuring the running parameter only when an irregularity is detected. A continuous detection of the running parameter can advantageously comprise an analog and/or a digital measurement of the running parameter. Thus, a detection means may be configured for detecting the running parameter for incremental detection and may output, for example, after a certain length or rotation a signal, by which the running parameter can be concluded. By detecting the running parameter during winding, for example, it is not necessary to manually measure it, so that the monitoring method can be further automated and thus costs can be reduced, while at the same time a reproducible, high accuracy can be provided.

Preferably, the running parameter may be determined by detecting an advance parameter of the web material. Preferably, a measurement of a number of rotations of the reel can additionally be performed. The advance can be understood as a portion of a driving means which acts on the web material in order to allow a propulsion. An advance parameter may comprise a speed, in particular a rotational speed and/or a tangential speed of a drive roll, at the advance. The measurement of the advance parameter can be set directly in relation to the actually wound length during winding and thus a high-quality indicator for the running parameter. At the advance, the web material already runs in a flat extension, so that accordingly, changing diameters of the reel at the advance do not or only play a small role. However, particularly preferably, the running parameter can be determined by measuring the advance parameter and by measuring the number of rotations of the reel. The measurement of the number of rotations of the reel permits a correction of the advance parameter, wherein here, preferably, an estimate of the diameter of the reel can be given. Thus, the actual measurement of the running parameter can occur at the advance, but it can be corrected based on the measurement of the number of rotations of the reel in order to at least partially eliminate slip at the advance. This results in a high accuracy of the determination of the running parameter.

In the context of the invention, it is also conceivable that providing the correlation of the irregularity to the running parameter comprises the following step:

entering the correlation of the irregularity to the running parameter in a database.

A database may preferably be considered as an electronic table. Thus, for example, a SQL server can be maintained on a storage medium, which provides a corresponding database. In particular, the correlation of the irregularity and the running parameter can be determined by relating them in such a way that the irregularity and the running parameter can be assigned to one another when being entered into the database. For example, through the database, the correlation can be viewed and reproduced before the unwinding process. As a result, for example, a plurality of irregularities can be provided jointly for the unwinding process after the end of the winding process, or even several irregularities from several different winding processes can be jointly provided for several reels. As a result, a simple possibility can be provided for making the irregularity and in particular a plurality of irregularities available for the unwinding process, wherein the database can be read out, for example, in order to obtain the desired information.

In a monitoring method according to the invention, it is furthermore conceivable that entering the correlation of the irregularity to the running parameter in the database comprises an access to an external server and/or a mobile storage unit. In this case, an external server can be understood as a computing unit which has a storage capacity for the database and is provided outside the winding device. For example, the external server can be part of a production system of the web material, part of a palletizing system or can be located externally at a service company. As a result, the storage of the data can be outsourced, for example, to use the resources of a provider of computing and/or storage capacity, so that costs of the winding device can be reduced, in particular because the winding device can thereby only require an interface to the external server. Via such a communication interface, the winding device can be brought into communication connection with the database on the external server. Furthermore, the external server can also be connected, for example, to the unwinding device or can be part of an unwinding device, so that data of the reels to be processed are transmitted directly to the processing process of the reels. Additionally or alternatively, it can be intended that the database is provided on a mobile storage unit. Thus, for example, the winding device itself may comprise a corresponding storage unit, which is built into the winding device, for example, as an internal HDD or SSD hard drive and thus the generated data is available on the winding device, for example to be visualized. A mobile storage unit has the advantage that it can be exemplarily connected via USB interface to the winding device to transfer appropriate data, wherein the mobile storage unit can then be transported as desired. This enables to provide the data with a delivery of several reels to an unwinding process. In particular, a processing unit can be provided, by means of which a computer program can be executed in order to allow access to an external server and/or a mobile storage unit. The access can be understood as a response of the respective device or a connection of the winding device to the external server and/or the mobile storage unit.

In the context of the invention, it is also conceivable that providing the correlation of the irregularity to the running parameter comprises the following step:

generating a reel-specific information medium.

Preferably, the information medium can also be arranged on the reel. An information medium may be, for example, a printed list on which the irregularity and the running parameter are noted. Preferably, the information medium may further comprise a transponder. A transponder may preferably be considered as a transmitting and/or receiving unit which stores the irregularity and the running parameter. In this case, the transponder can be configured passive or active, wherein a passive transponder draws required energy from an electromagnetic field, with which the transponder is excited when reading out. Alternatively, the transponder may be actively configured and have its own power source, such as a battery, to transmit the data upon activation. A particularly preferred embodiment of the transponder is an RFID chip which can be produced easily and inexpensively and can be arranged on the reel in order to make the information available to the unwinding process. It is also conceivable that the information medium has a bar code which can be glued, for example, on the reel, in particular the reel sleeve, in order to provide the information in the unwinding process in a simple manner. By providing an information medium, especially on the reel, an easy way is given to communicate the correlation between the irregularity and the running parameter for an unwinding process, whereby a complex IT infrastructure is not necessary. The information medium can be advantageously read out manually or with a mobile reader.

In the context of the invention, it is also conceivable that providing the correlation of the irregularity to the running parameter comprises the following step:

visualizing the correlation of the irregularity to the running parameter on the winding device.

The visualization of the correlation can occur, for example, on a display of the winding device, on which respectively assignable values between the irregularity and the running parameter can be displayed. This may allow an operator of the winding device to note these values. For example, the operator can generate a reel-specific information medium based on the visualization. Additionally or alternatively, it can be intended that the operator evaluates the irregularity, whether it is relevant for the unwinding process, so that the irregularity is possibly discarded and only particularly relevant correlations between further irregularities and further running parameters are transmitted. Thus, for example, it can also be intended that the operator confirms the correlation on a touch screen before it is written to a reel-specific information medium and/or automatically into a database.

In a monitoring method according to the invention, it can further be intended that the irregularity comprises a process parameter which lies outside of a parameter range. The process parameter may be, for example, an elasticity of the web material, which deviates in a certain range and thus the irregularity is formed. The parameter range can have a first parameter limit, preferably a first and a second parameter limit. If the process parameter exceeds the first parameter limit and/or the process parameter falls below the second parameter limit, this can be classified as an irregularity. The parameter limits can be absolute or relative. Thus, an absolute parameter limit at the beginning of the monitoring method can be predefined or being predefined and thus, in particular, provide a fixed value. For example, a relative parameter limit may define an irregularity such that the process parameter is averaged dynamically over a certain length during the winding process and a certain percentage above or below the averaging defines the relative parameter limit. As a result, an adaptive adjustment of the definition of the irregularity can be given in order to be able to classify process-related changes accordingly. In addition, the definition of a process parameter or a parameter range provides an easy possibility for automating the monitoring method and simultaneously obtaining a reproducibility of the result of the classification of the irregularity.

In the context of the invention, it is also conceivable that the monitoring method comprises at least one of the following steps:
   providing a material composition of the web material,
   providing a relative position of the web material to a reference position on the reel.

The relative position may preferably comprise a transverse position of the web material on the reel sleeve. Thus, for example, a centering of the web material on the reel sleeve can change during winding, so that further wound web material is not positioned congruent with the already wound material on the reel. This may be relevant to viewing an irregularity at a particular position if corresponding response actions are to be taken during an unwinding process. A material composition of the web material may further comprise, for example, certain basic data of the web material. Thus, for example, when setting relative parameter limits for classifying the irregularity, it may be interesting for the successor process to determine which material composition is given at the position of the irregularity, for example to define a corresponding response action. In particular, a transverse position of the irregularity in correlation with the running parameter can also be made available to an unwinding process in order to be able to adjust appropriate actions during the unwinding process.

According to a further aspect of the invention, a control method for performing an unwinding process on an unwinding device is claimed. The control method comprises the following steps:
   at least partially unwinding a web material from a reel,
   obtaining a correlation of an irregularity of the web material to at least one running parameter of the reel from a winding process,
   performing a response action in response to the irregularity when a position of the web material is reached based on the correlation of the irregularity to the running parameter upon unwinding of the web material.

The position of the web material based on the correlation of the irregularity to the running parameter may preferably be the location on the reel which has been defined by the running parameter in the winding process by means of the correlation between the irregularity and the running parameter. In particular, the position can be defined relative to a winding end and/or a winding start of the web material. Advantageously, the position may be provided directly on the reel based on the correlation of the irregularity and the running parameter, or at another location in the unwinding process. In particular, the reaching of the position can be given when the web material is unwound so far that the irregularity is positioned at a region of the unwinding device for performing the response action. For example, if the winding process provides the running parameter as a length already wound on the reel at the position of the irregularity, it can be converted by calculating the nominal length of the web material minus the running parameter in order to conclude the position of the running parameter during unwinding. Preferably, the position of the running parameter can be defined by the fact that the length from the beginning of the unwinding to the position of the running parameter is directly represented by the running parameter. The control method can also be understood as a method for controlling and/or regulating the unwinding process. In this case, the correlation can be obtained, for example, automatically or communicated to an operator who operates the unwinding device in accordance with the information. The response action may comprise at least one of the following actions:
   interrupting the unwinding process,
   changing a speed of unwinding the web material,
   changing of processing parameters,
   suspending individual processing steps,
   adding individual special processing steps.

Thus, interrupting the unwinding process may comprise stopping the unwinding device to allow, for example, an operator to access the unwinding device. By changing a speed of unwinding, additional time can be gained to inspect the irregularity, for example, or to perform further response actions. For example, a change of processing parameters may comprise an adjustment of a welding temperature for sacks subsequently produced from the web material, a change in a cooling time of the web material, or the like. Also, the change of processing parameters may comprise a change in product specifications such as, for example, dimensions of a product produced from the web material, a height of sacks produced from the web material, or a fill weight thereof. As a result, an irregular web material can still be processed without the unwinding process being stopped and/or material being lost. Furthermore, processing steps such as welding, filling or stretching of the web material can be suspended so that rejects are easily detected and can be sorted out later in the processing process. Also, by adding further special processing steps such as marking the web material at the position of the irregularity, ejection of sorted material and/or removal of sorted material, it can be reacted accordingly, not to jeopardize the process and thereby allowing a particularly smooth continuation of the unwinding process.

In particular, in a control method according to the invention, it is conceivable that the response action comprises a visual and/or acoustic output of a warning signal. By the warning signal, for example, an operator of the unwinding device can be informed about the occurrence of the irregularity, so that he can perform further response actions. The warning signal can be issued, for example, via a warning light, a display or as an acoustic signal. The acoustic signal may be, for example, a warning tone of a loudspeaker. This represents a simple action to involve an operator at an optionally critical position of the process in the unwinding process, wherein the unwinding process can preferably proceed essentially automatically until the response action.

In the context of the invention, it can further be provided that obtaining the correlation of the irregularity to the running parameter comprises the following step:
   reading out the correlation of the irregularity to the running parameter from a database.

In particular, the database is a database into which the data has previously been entered by means of a monitoring method of a winding process. In this case, the reading out can be done manually or automatically. Preferably, the database can be constructed as a table, wherein the irregularity and the running parameter can each be assignable to one another in a column, for example by both data being noted in the same row of the table. In this case, the database may also allow an assignment of the running parameter and the irregularity to the reel, for example by the reel having an identification number which has likewise been entered into the database. This may allow to manage multiple reels in the same database. Additionally or alternatively, the database can be generated specifically for the reel and thus the data can be directly assigned to the reel. In particular, the read-out can be performed by a computing unit which automatically reads out, under the control of a computer program, and provides the irregularity and the running parameters for the current unwinding process.

Within the scope of the invention, it is also conceivable that reading out the correlation of the irregularity to the running parameter from the database comprises an access to an external server and/or a mobile storage unit. Thus, the computing unit can advantageously be configured to retrieve data from the external server and/or the mobile storage unit. Preferably, the external server and/or the mobile storage unit may have previously been supplied with the data of the irregularity and the running parameter from a winding process. The external server enables to centrally manage the data and perform the control method anywhere, regardless of the location of the database. For example, the access may comprise Internet access, whereby an Internet connection is established with the external server and thereby the reading out can be ensured. A mobile storage unit has the advantage that a communication structure can be provided in a simple manner, since an Internet access, for example, is not necessary and the mobile storage unit can be supplied to the unwinding process, for example with the transport of the reel or with a delivery of several reels, so that, for example, the unwinding device may need only a USB interface to provide the access to the database. Both the external server and the mobile storage unit are simple ways to provide the data in a simple manner, in particular digitally and at the same time to connect a winding process and an unwinding process with respect to the relevant data, so that data generated already during the winding process are also available in the unwinding process.

Advantageously, in a control method according to the invention, obtaining the correlation of the irregularity to the running parameter may comprise the following step:

reading out a reel-specific information medium.

Preferably, the information medium can be arranged on the reel. The information medium can comprise a barcode which can be read out by a barcode scanner, in particular even by a mobile telephone, at the location of the unwinding device or upon delivery of the reels.

Preferably, the information medium may comprise a transponder, which is easily readable and also inexpensive to produce. The arrangement of the information medium on the reel can further ensure that the correct correlation between the irregularity and the running parameter is assigned to the respective reel, so that the handling of the reel during delivery for the unwinding process is simplified. Preferably, the information medium can be glued to the reel, so that a secure hold of the information medium is ensured on the reel.

Within the scope of the invention, the control method may comprise the following step:

visualizing the correlation of the irregularity to the running parameter on the unwinding device.

As a result, it can be ensured that an operator can check and/or evaluate the information of the correlation between the irregularity and the running parameter once again on the unwinding device. For example, it may be intended that the operator first confirms the irregularity before the unwinding process or before the response action is performed. In particular, the visualization of the correlation can be performed on a display of the unwinding device. The visualization may comprise displaying a graph or a diagram. Preferably, a plurality of irregularities and a plurality of running parameters can each be displayed in correlation, so that the operator can quickly identify critical locations of the reel where, for example, an accumulation of irregularities occurs, and for example define a response action.

Advantageously, it can be provided in a control method according to the invention that a return parameter of the reel is determined during the at least partial unwinding of the web material, wherein the return parameter is related to the running parameter. In particular, the return parameter can be determined continuously. The determination of the return parameter may advantageously comprise a direct measurement and/or a calculation. A return parameter may preferably be understood as a length which corresponds to the running parameter with respect to the reel. For example, the running parameter may comprise a length of web material already wound during the winding process when the irregularity occurs, and the return parameter may accordingly be a length that is already unwound when the irregularity occurs. In this case, the return parameter may be a length of the web material on the reel minus the running parameter. In particular, the return parameter can thus be calculated from the running parameter and further data of the reel. Preferably, the calculation can be performed by a computing unit, when the position of the running parameter is reached when unwinding the web material or when the reel is supplied to the unwinding device. As a result, it is possible to provide a translation of the running parameter from the winding process for the unwinding process so that both methods are compatible with one another in a simple manner, and in particular during the winding process, a processing during the unwinding process is not taken into account, or is taken into account only to a slight extent. In the context of the invention, it is alternatively conceivable that e.g. the running parameter is detected during unwinding of the web material from the reel. Preferably, the running parameter can be detected continuously during the unwinding of the web material from the reel. A continuous detection may comprise an analog and/or a digital measurement. Thus, a measuring unit for detecting the running parameter or the return parameter can work incrementally and e.g. output a signal after a certain length or rotation, from which can be concluded to the running parameter or return parameter. By detecting the return parameter or the running parameter during unwinding it is for example not necessary to measure it manually, so that the control method can be further automated and thus costs can be reduced and at the same time a reproducible, high accuracy can be provided.

Furthermore, in a control method according to the invention, the response action may comprise cutting out a portion of the web material in a region of the irregularity. Thus, for example, in the absence of a printed image, it is conceivable that the unwinding device is stopped or slowed down and the region in which the printed image is absent is automatically cut out by a cross-cutting means such as a knife mounted in the unwinding device. Additionally or alternatively, the cutting can also comprise manual activities. Conceivable manual activities are, for example, the cutting itself and/or a re-threading of the web material in a receiving means of the subsequent process. By cutting, an effect of the irregularity on a subsequent process can be avoided and, at the same time, the reel can continue to be used despite the occurrence of the irregularity. In this case, in particular, the cutting can be configured such that a waste of the web material is minimized.

In the context of the invention, it may further be provided that the response action comprises stopping the unwinding device. In particular, unwinding of the web material can be interrupted by stopping the unwinding device. In particular, stopping the unwinding device may comprise at least partially disabling the unwinding device. Furthermore, it can thereby ensure access of the operator in a secure manner, so that further manual activities can be performed on the web material, such as an inspection of the irregularity.

Preferably, the position of the running parameter can be determined by detecting an advance parameter of the web material. In particular, a measurement of a number of rotations of the reel can be performed. The measurement of the advance parameter can be set directly in relation to the actually unwound length during unwinding and is thus a high-quality indicator for the running parameter. However, particularly preferably, the running parameter can be determined by measuring the advance parameter and by measuring the number of rotations of the reel. The measurement of the number of rotations of the reel permits a correction of the advance parameter, wherein here, preferably, an estimate of the diameter of the reel can be given. Thus, the actual measurement of the advance parameter may be corrected based on the measurement of the number of rotations of the reel to at least partially subtract out slip on the advance. This results in a high accuracy of the determination of the running parameter.

In the context of the invention, it is also conceivable that the control method further comprises at least one of the following steps:
  obtaining a material composition of the web material,
  obtaining a relative position of the web material to a reference position on the reel.

Due to the material composition and/or the relative position, a further basis for performing the response action can be provided, thereby further improving the handling of the reel. In particular, thereby further irregularities can be tolerated and thus the reel can be further processed in the unwinding process.

In a control method according to the invention, it is furthermore conceivable that a number of products produced from the web material is determined based on the running parameter and/or the return parameter. Preferably, the products may be sacks made from plastic film. Thus, due to the running parameter and in particular by taking into account any unprocessed irregularities of the web material, it is possible to perform a calculation of the total length and/or total area of the web material. This in turn allows the number of products produced from the web material from a specific reel to be calculated. Compared to an estimate of the weight of the reel, there is also the advantage that the determination based on the running parameter and/or the return parameter is substantially or completely adjusted by a possibly varying thickness of the web material.

In particular, a further aspect of the invention may lie in a quantification method for determining a number of products produced from a web material in an unwinding process of an unwinding device, wherein the quantification method comprises the following steps:
  at least partially unwinding the web material from a reel,
  detecting at least one running parameter and/or return parameter of the reel,
  calculating the number of products produced from the web material, in particular sacks, based on the running parameter and/or the return parameter of the reel, in particular wherein at least one irregularity of the web material and/or the unwinding process is taken into account.

This results in the advantage that the determination based on the running parameter can be substantially or completely adjusted for a possibly fluctuating thickness of the web material, so that an accuracy of the determination of the number can be improved and/or so that the determination of the number of produced products can be automated. In particular, features and details that have been described in connection with the control method according to the invention, the monitoring method according to the invention, the inventive unwinding device, the winding device according to the invention and/or the processing system according to the invention, of course, also in connection with the quantification method according to the invention and in each case vice versa, so that with respect to the disclosure of the individual inventive aspects always mutual reference is or can be drawn. In particular, the features of the respective characterizing portion of the present dependent claims of the control method according to the invention can also represent further developments of the quantification method.

According to another aspect of the invention, a processing method for performing a process of processing a web material is claimed. The processing method further comprises the following steps:
  performing a monitoring method according to the invention for monitoring a winding process on a winding device,
  performing a control method according to the invention for performing an unwinding process on an unwinding device.

Thus, a processing method according to the invention provides the same advantages as have already been described in detail with reference to a monitoring method according to the invention and to a control method according to the invention. In particular, the processing process may involve winding the web material and unwinding the web material. The winding can also be continued, in particular, if an irregularity is detected during the winding process and the unwinding process can react accordingly.

Preferably, therefore, the processing method may also comprise the following step:
  transferring a correlation of an irregularity of the web material to a running parameter of a reel to the unwinding device.

As a result, it can be ensured that the data from the winding process are made available to the unwinding process, wherein the transfer can be performed manually and/or digitally.

The order of the individual method steps of a monitoring method according to the invention, a control method according to the invention and/or a processing method according to the invention can be performed in the order described. Furthermore, however, another than the respective described order of the method steps is conceivable. In particular, individual method steps or all method steps can be repeated and/or executed in parallel.

According to a further aspect of the invention, a winding device for performing a winding process of a web material to a reel is claimed. In this case, the winding device has a sleeve holder on which a reel sleeve can be stored for winding the web material during the winding process, a detection unit by which at least an irregularity of the web material can be detected, and a providing means for providing a correlation of the irregularity to a running parameter of the reel for an unwinding process.

In this case, a control unit can preferably be provided, by means of which a monitoring method according to the invention can be performed. The providing means may preferably comprise an interface and/or the control unit so that the data from the winding process can be provided for the unwinding process. Additionally or alternatively, the providing means may comprise a display on which the data can be visualized to an operator, so that he can transmit the data to the unwinding process, for example upon delivery of the reel. Thus, a winding device according to the invention brings about the same advantages as have already been described in detail with reference to an inventive monitoring method. Furthermore, the running parameter may advantageously be measurable and/or determinable by means of a measuring unit.

According to a further aspect of the invention, an unwinding device for performing an unwinding process of a web material of a reel is claimed. The unwinding device has a reel holder on which the reel can be stored during the unwinding process, a reference interface for obtaining a correlation of an irregularity of the web material to a running parameter of the reel, and a position detection unit, by which an unwinding of the web material can be monitored during the unwinding process, so that a response action in response to the irregularity can be performed, when a position of the web material is reached based on the correlation of the irregularity to the running parameter in the unwinding process.

The monitoring of the position detection unit may e.g. comprise a detection of the running parameter or a return parameter. Preferably, the unwinding device can have a computing unit, by means of which a control method according to the invention can be performed. Thus, an unwinding device according to the invention enables the same advantages as have already been described in detail with reference to a control method according to the invention. The reference interface can be a digital or analog interface through which the data of the unwinding device can be supplied. For example, the reference interface may comprise a network interface through which the data is receivable or obtainable by means of an access to a server. Further, the reference interface may comprise, for example, an input unit through which the data may be manually input by an operator. In this case, the data can preferably be processed by the computing unit. The position detection unit may preferably comprise a measuring unit and/or a computing unit or may be in connection with the computing unit. The measuring unit can preferably be used to determine the running parameter and/or a return parameter by measuring an advance of the web material and/or by measuring a number of rotations of the reel. The measurement of the advance can be set directly in relation to the actually unwound length. Thus, the web material can preferably already run in a flat extension at the advance, so that accordingly changing diameter of the reel at the advance play no or only a minor role. Particularly preferably, the running parameter can be determined by measuring the advance of the web material and measuring the number of rotations of the reel. Thus, the actual measurement of the running parameter may occur at the advance, but this can be corrected based on the measurement of the number of rotations of the reel in order to at least partially eliminate a slip at the advance. As a result, an accuracy of the determination of the running parameter can be increased. Furthermore, an unwinding device according to the invention, in particular the computing unit of the unwinding device, can be configured to perform a quantification method for determining a number of products produced from the web material.

In the case of an unwinding device according to the invention, it is also conceivable that the unwinding device is configured to produce sacks made of the web material, in particular of tubular and/or flat web material. For this purpose, the unwinding device may have at least one folding means for folding the sacks and/or at least one closing means for closing the sacks. Thus, the closing means may be configured to form a fold and/or to weld the web material to close the sacks. The folding means may comprise a guiding means through which the web material can be conducted, in particular during propulsion, so that a sack shape is formed at least partially from the web material. Furthermore, the unwinding device can have at least one filling means, by means of which sacks produced from the web material can be filled. Thus, the unwinding device may be adapted to produce sacks ready for delivery from the web material and/or fill products, in particular so that the entire production process of the sacks from the delivery of the raw material (e.g., web material and fill products) can be projected by the unwinding device. By detecting one or more irregularities, rejects can be reduced at the same time and/or delivery of defective sacks can be avoided. The unwinding device thus preferably comprises a so-called FFS machine, the abbreviation FFS meaning "shape, fill and seal".

According to another aspect of the invention, a processing system for processing a web material is claimed. In this case, the processing system has a winding device according to the invention and an unwinding device according to the invention. In particular, the processing system may further comprise an external server for exchanging data between the winding device and the unwinding device. Thus, a processing system according to the invention allows the same advantages as have already been described in detail with respect to a winding device according to the invention and as have already been described in detail with reference to an unwinding device according to the invention.

Figure 2:
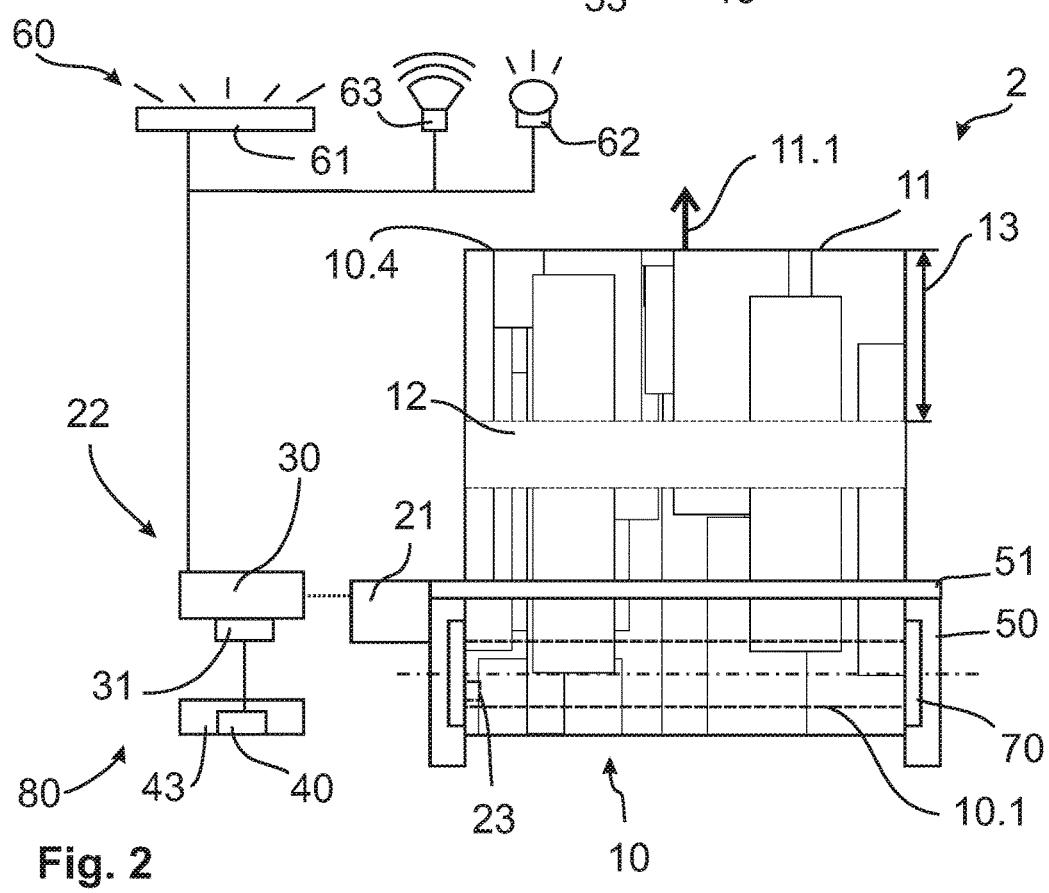
Figure 3:
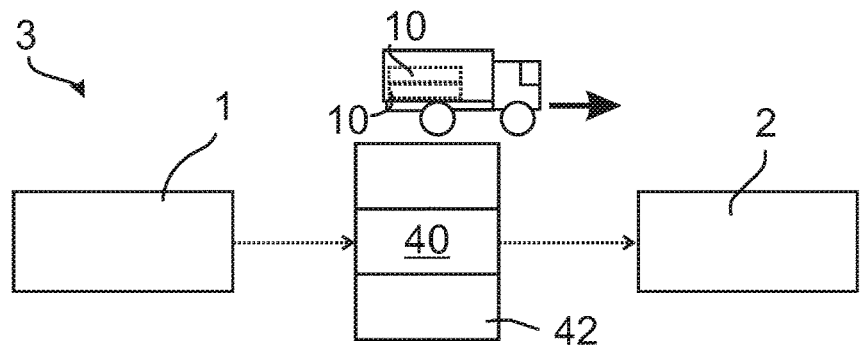
Figure 4:
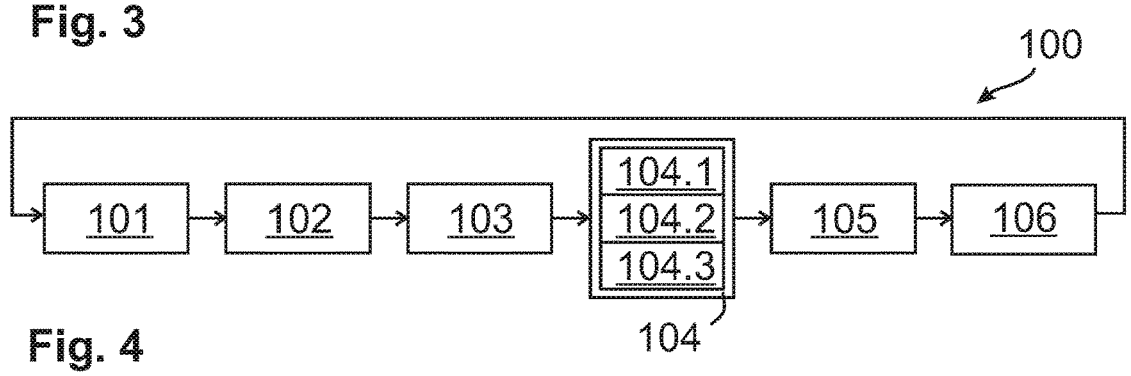
Figure 6:
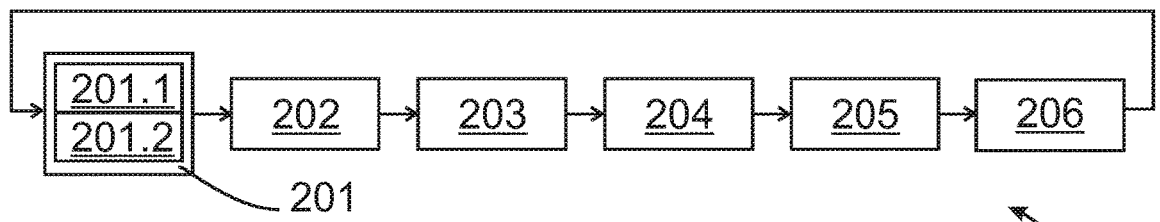
Figure 8:
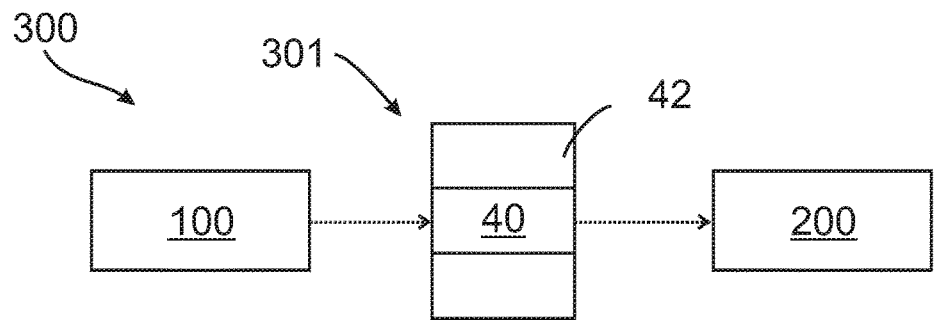
Figure 9A:
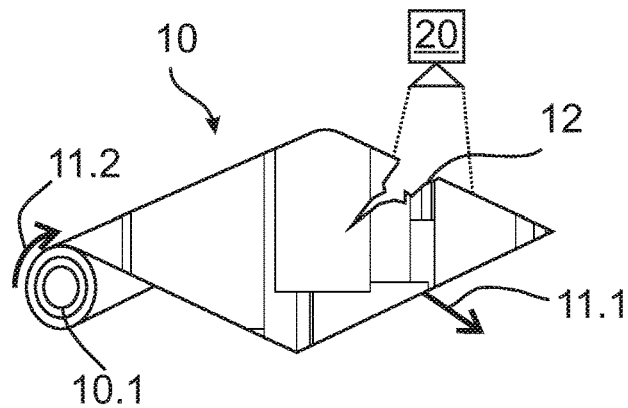
Figure 9B:
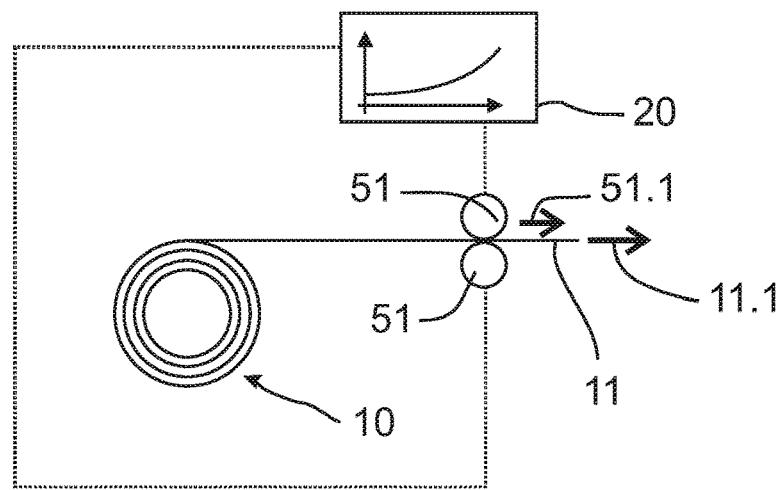
Figure 9C:
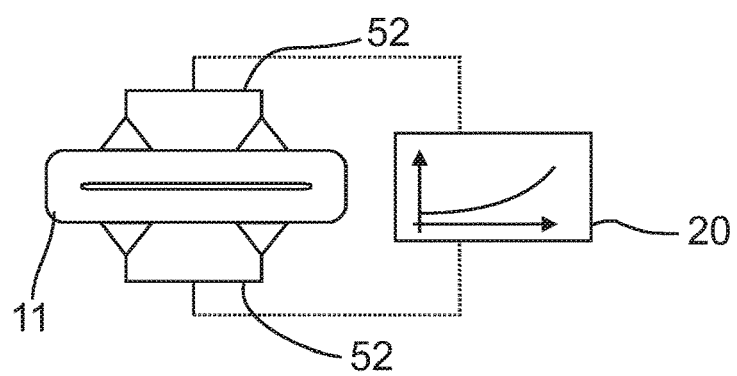

Further measures improving the invention will become apparent from the following description of some embodiments of the invention, which are schematically illustrated in the figures. All of the resulting features and/or advantages including constructive details, spatial arrangements and method steps of the claims, the description or the drawings may be essential to the invention both in itself and in various combinations. It should be noted that the figures are merely descriptive and are not intended to limit the invention in any way. In the Figures show:

FIG. 1 a winding device according to the invention in a schematic plan view in a first embodiment;

FIG. 2 an unwinding device according to the invention in a schematic plan view in a further exemplary embodiment;

FIG. 3 a processing system according to the invention in a schematic view in a further exemplary embodiment;

FIG. 4 an inventive monitoring method for monitoring a winding process in a schematic view of the method steps in a further embodiment;

FIG. 5*a*-5*e* a schematic view of method steps of the monitoring method of the embodiment of FIG. 4;

FIG. 6 a schematic view of a control method according to the invention for performing an unwinding process in a further exemplary embodiment;

FIG. 7*a*-7*e* a schematic view of method steps of the control method of the embodiment of FIG. 6;

FIG. 8 a processing method according to the invention for processing a web material in a further exemplary embodiment in a schematic view;

FIG. 9*a*-9*c* conceivable irregularities in further embodiments in a schematic view.

In the following figures, the identical reference signs are used for the same technical features of different embodiments.

FIG. 1 shows a winding device 1 according to the invention in a schematic plan view in a first embodiment. In this case, a web material 11 is provided by a production unit 4 for a winding process. The winding device 1 is suitable for performing the winding process of the web material 11 to a reel 10. For this purpose, the winding device 1 further comprises a sleeve holder 71, on which a reel sleeve 10.1 can be stored. In the state of the winding process shown here, a portion of the web material 11 is already wound on the reel sleeve 10.1 to form a reel 10, wherein a propulsion 11.1 of the web material 11 is supported or ensured by a driving means 53. Preferably, the reel 10 can rotate with a certain number of rotations 11.2. For this purpose, the driving means 53 has drive rolls 51, between which the web material 11 is passed centered and then wound onto the reel 10. Additionally or alternatively, the sleeve holder 71 itself may be configured such that it is rotatable, in particular by the drive 53, so that by the rotation of the reel sleeve 10.1 or the sleeve holder 71, the propulsion 11.1 is realized or supported. Furthermore, the winding device 1 has a detection unit 20, by which at least one irregularity 12 of the web material 11 can be detected. The irregularity 12 is shown here as an absence of a printed image on the web material 11. However, other alternatives are conceivable, such as irregularities 12, which are shown in FIGS. 9*a* to *c*. If the irregularity 12 is detected by the detection unit 20, the irregularity 12 can be correlated with a running parameter 13 of the reel 10 in particular by a control unit 32, or the correlation can be determined. The running parameter 13 may comprise an already wound length of the web material 11 on the reel 10 from a winding start 10.3 until the occurrence of the irregularity 12 and/or an already wound length of the web material 11 from the winding start 10.3 to the end of the irregularity 12.

Further for detecting the running parameter 13, a measuring unit 24 can be provided, which is suitable for detecting the actually wound length of the web material 11. If the irregularity 12 and the running parameter 13 are brought together by the control unit 32, a correlation between the irregularity 12 and the running parameter 13 can be provided or generated. The correlation may comprise that the running parameter 13 is assignable to the irregularity 12 with respect to the reel 10. As a result, even in a subsequent process, in particular in an unwinding process, it can be reacted to the irregularity 12 in the reel 10. For this purpose, the winding device 1 comprises a providing unit 81, which is configured to provide the correlation between the irregularity 12 and the running parameter 13. For this purpose, the providing unit 81 may comprise the control unit 32. In particular, the providing unit 81 comprises a communication interface 33, by means of which access to a database 40 can be generated. As a result, the correlation between the irregularity 12 and the running parameter 13 can be stored in a database 40 by the control unit 32. In particular, the database 40 may be part of a mobile storage unit 43 which is connected to the winding device 1 or the communication interface 33. For example, the communication interface 33 may be a USB interface. Additionally or alternatively, the database 40 may be provided on an external server 42, which in particular is not part of the winding device 1. This allows the data to be managed centrally, for example. In addition, the winding device 1 has an output unit 60 which has a display 61, a loudspeaker 63 and a light source 62. Alternatively, the display 61 and/or the loudspeaker 63 and/or the light source 62 may be provided individually. This allows, for example, to output a warning signal if the detection unit 20 detects an irregularity 12. In particular, the correlation between the irregularity 12 and the running parameter 13 can also be displayed via the display 61 on the winding device 1, so that an operator has access to it. Furthermore, an information medium 23, in particular in the form of a transponder, can be arranged on the reel 10, the information medium 23 having the correlation between the irregularity 12 and the running parameter 13.

FIG. 2 further shows an unwinding device 2 according to the invention for performing an unwinding process of a web material 11 from a reel 10. In particular, the reel 10 may have been produced by a winding device according to the exemplary embodiment of FIG. 1. In this case, the unwinding device 2 has a reel holder 70, on which the reel 10 can be stored during the unwinding process. In order to produce a propulsion 11.1 of the web material 11, a driving means 50 may further be provided, which has drive rolls 51 which allow the propulsion 11.1 of the web material 11. Thus, for example, each of the drive rolls 51 may have a textured surface to convey the web material 11 upon contact with the web material 11 and rotation. Additionally or alternatively, it can also be ensured by the driving means 50 that the reel 10 is actively rotated and thereby the propulsion 11.1 of the web material 11 is supported or ensured. Furthermore, the unwinding device 2 has a position detection unit 22, by which an unwinding of the web material 11 during the unwinding process can be monitored, so that a response action in response to an irregularity 12 can be performed, when the position of the web material 11 is reached in the unwinding process. For this purpose, the position detection unit 22 may preferably comprise a computing unit 30, which is in communication connection with a measuring unit 21, wherein, by the measuring unit 21, the actual unwound length of the web material 11 from the reel 10 can be detected or the computing unit 30 can be provided with measurement data, so that the actually unwound length of the web material 11 can be calculated. Moreover, the unwinding device 2 comprises a reference interface 80, by which a correlation between an irregularity 12 and a running parameter 13 of the reel 10 can be obtained. For this purpose, the reference interface 80 can comprise, for example, a communication interface 31 to allow the computing unit 30 to access a database 40, wherein the database 40 may be preferably provided on a mobile storage unit 43 or an internal storage unit, which is connected to the unwinding device 2. Additionally or alternatively, the database 40 may be provided on an external server 42, which is arranged outside of the unwinding device 2 and thus can provide the data in a centralized manner. Additionally or alternatively, furthermore, a display 61 of an output unit 60 may be provided, wherein the display 61 may also be configured as a touchscreen in order to input the data and thus provide the data to the unwinding device 2. The response action in response to the irregularity 12 may comprise an indication on the display 61, an output of a warning tone via a loudspeaker 63 and/or a warning signal via a light source 62. Additionally or alternatively, it may be provided that an information medium 23 of the reel 10 is read out, wherein the information medium 23 may be preferably provided as a transponder, in particular as an RFID transponder. The information medium 23 is preferably arranged on the reel 10, in order to be clearly assignable to the reel 10. Preferably, a determination of a number of products produced from the web material 11 can also be performed by the computing unit 30, so that it can be determined instead of counting based on the running parameter 13 and thus the number can be assigned to the reel 10. In particular, by means of the unwinding device 2, a quantification method for determining the number of products produced from the web material 11 can be performed.

FIG. 3 shows a schematic view of a processing system 3 according to the invention for processing a web material 11 in a schematic representation. In this case, a winding device 1 is provided, which may preferably be configured according to the winding device of the embodiment of FIG. 1. Furthermore, the processing system 3 comprises an unwinding device 2, which may preferably be configured according to the embodiment of FIG. 2. With the winding device 1, the web material 11 can be wound into a reel 10, which is then transported to the unwinding device 2. This can be performed within a hall or comprise a distribution channel which, for example, comprises the delivery to a customer who wishes to further process the web material 11 of the reel 10. To the reel 10, an external server 42 is further provided, which has a database 40 which stores a correlation of an irregularity 12 to a running parameter 13 of the reel 10. Both the winding device 1 and the unwinding device 2 are connected to the external server 42 in order to be able to provide the data on the one hand and to retrieve the data on the other hand. Additionally or alternatively to the external server 42, it may be provided that the data is provided, for example, with the delivery of the reel 10 on a mobile storage unit 43 and/or an information medium 23.

Figure 5A:
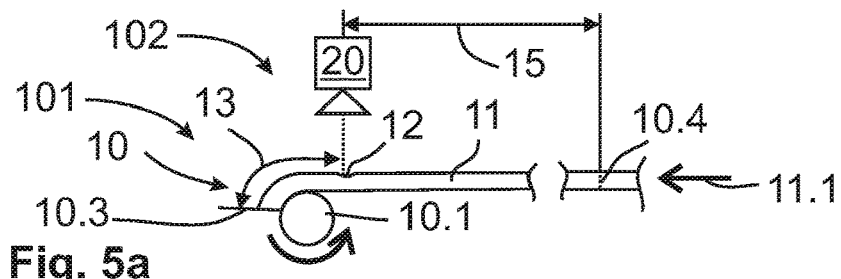
Figure 5B:
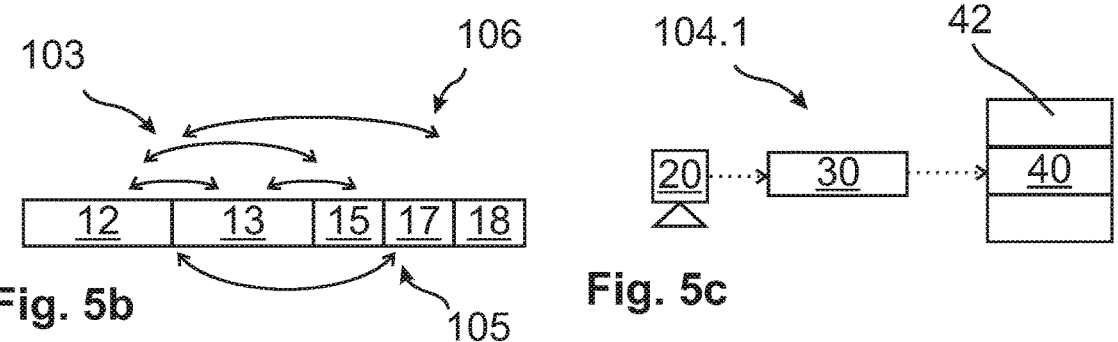
Figure 5C:
Figures 5D, 5E:
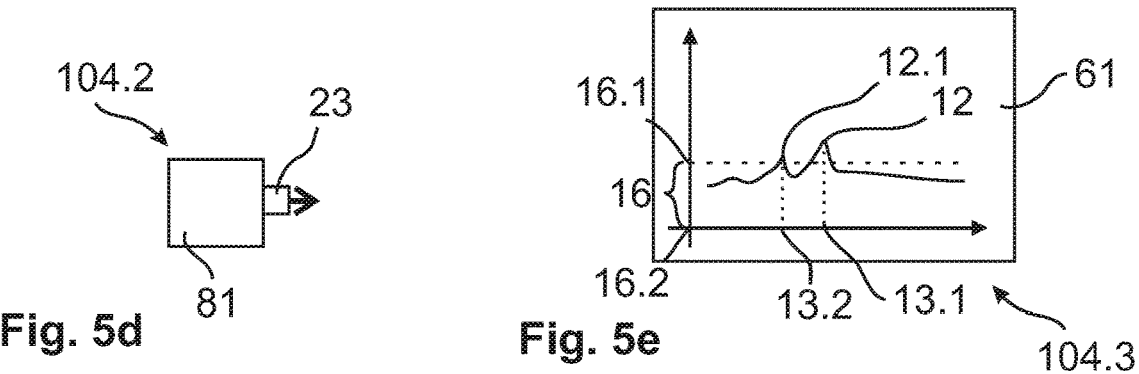

FIG. 4 shows a monitoring method 100 according to the invention for monitoring a winding process on a winding device 1. The monitoring method 100 comprises at least partially winding 101 of a web material 11 into a reel 10. The at least partially winding 101 is shown in more detail in FIG. 5a. In this case, an initially flat extending web material 11 is wound around a reel sleeve 10.1, so that the web material 11 is portioned and thus salable or transportable. In particular, during the winding 101, detecting 102 is provided which, according to FIG. 5a, can be performed by a detection unit 20. The irregularity 12 can, for example, comprise the absence of a printed image on the web material 11. For example, the detection unit 20 can be configured as a camera in order to optically detect the irregularity 12. During the winding 101, a running parameter 13 can also be detected, in particular continuously. The running parameter 13 may comprise an already wound length of the web material 11 from a winding start 10.3 to the position of the irregularity 12 or the running parameter 13. In particular, the running parameter 13 may be determined by detecting a return parameter 15, e.g. a length from a winding end 10.4 of the web material 11 to the position of the irregularity 12 or the running parameter 13. The monitoring method 100 further comprises determining 103 a correlation between the irregularity 12 and at least one running parameter 13 of the reel 10. In this case, for example, the correlation can occur by assigning the running parameter 13 to the irregularity 12. Such an assignment in the form of a table line is shown in FIG. 5b. In addition, as a step of the monitoring method 100, providing 104 of the correlation between the irregularity 12 of the web material 11 and the running parameter 13 of the reel 10 occurs for an unwinding process. In this case, providing 104 of the correlation can comprise entering 104.1 the irregularity 12 to the running parameter 13 in a database 40, as shown schematically in FIG. 5c. In this case, the irregularity 12 is detected via a detection unit 20, reported to a computing unit 30, which enters the correlation of the irregularity 12 to the running parameter 13 in a database 40, wherein the database 40 can be provided on an external server 42. Additionally or alternatively, the database 40 may be provided on a mobile storage unit 43. Additionally or alternatively, providing 104 of the correlation may comprise generating 104.2 a reel-specific information medium 23, as shown in FIG. 5d. In this case, the information medium 23 is provided by a providing unit 81. For example, the information medium 23 may comprise a barcode which is printed by the providing unit 81 or an RFID chip which is generated by the providing unit 81. Additionally or alternatively, providing 104 of the correlation may comprise visualizing 104.3 the correlation of the irregularity 12 to the running parameter 13 on the winding device 1. This is illustrated for example in FIG. 5e, wherein the irregularity 12 and the running parameter 13 are assignable to each other and can be visualized on a display 61 of the winding device 1. This allows an operator to view the data and directly recognize the assignment, i.e. the correlation. As shown, a parameter range 16 may be provided which is defined by at least one parameter limit 16.1, preferably by two parameter limits 16.1, 16.2. If the process parameter exceeds a first parameter limit 16.1 or falls below a second parameter limit 16.2, an irregularity 12 is assumed. In this case, a plurality of irregularities 12, 12.1 can be correlated to a plurality of values 13.1, 13.2 of the running parameter 13 or a plurality of running parameters respectively and displayed graphically.

Figure 7A:
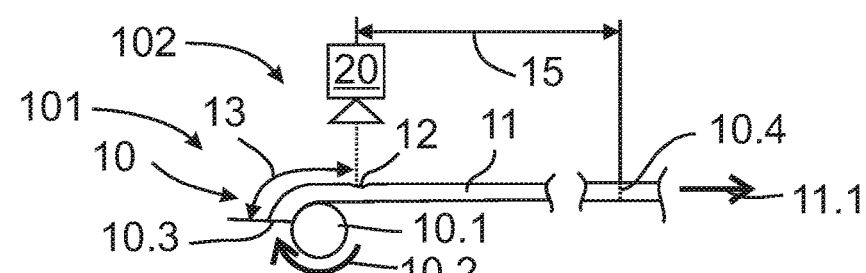
Figures 7B, 7C:
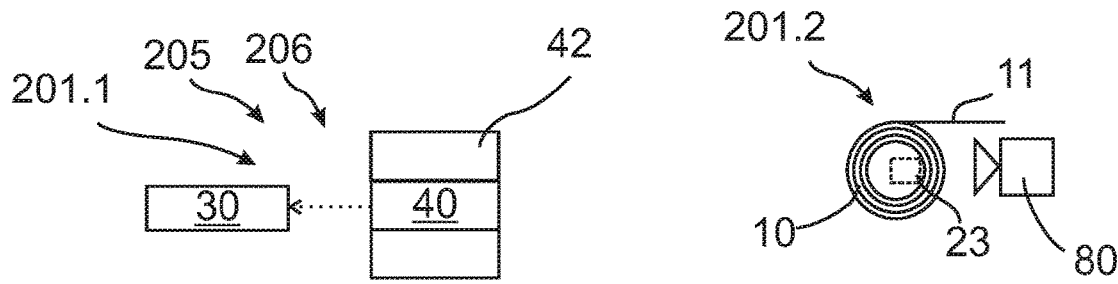
Figures 7D, 7E:
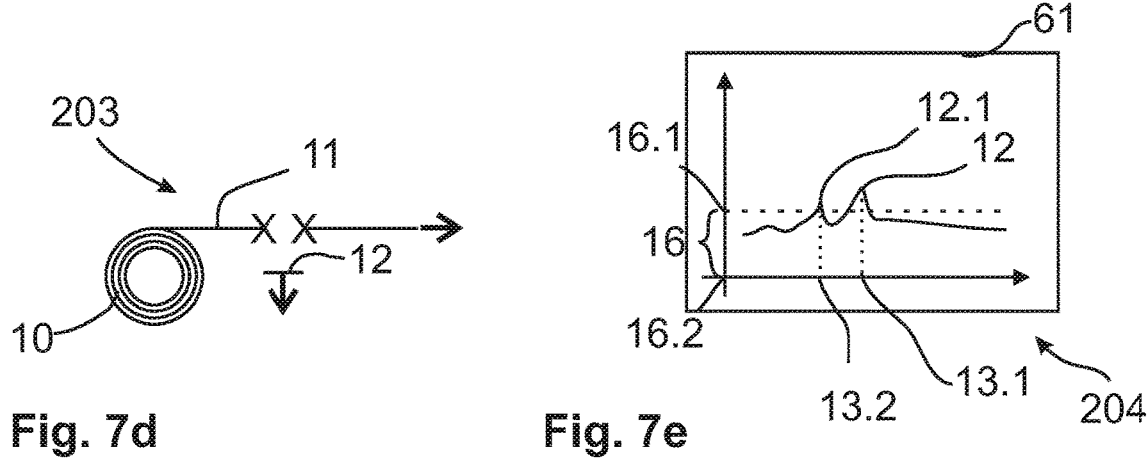

FIG. 6 further shows a control method 200 according to the invention for performing an unwinding process on an unwinding device 2. In this case, the control method 200 comprises obtaining 201 a correlation of an irregularity 12 of a web material 11 to at least one running parameter 13 of the reel 10 from an unwinding process. In this case, obtaining 201 the correlation may comprise reading out 201.1 the irregularity 12 of a running parameter 13 from a database 40. This is illustrated for example in FIG. 7b, wherein a database 40 can be provided on an external server 42, whose data are retrieved by access to the external server 42, in particular by a computing unit 30 performing the reading out 201.1. The control method 200 further comprises at least partially unwinding 202 the web material 11 from the reel 10, as illustrated for example in FIG. 7a. In this case, the web material 11 is pulled from the reel 10 by a driving means 50 or the reel 10 is rotated, so that the web material 11 has a flat extension during unwinding. Additionally or alternatively to obtaining 201 the correlation by reading out 201.1 from the database 40, according to FIG. 7c, it can furthermore be provided that a reference interface 80 has a detection means for reading out 201.2 an information medium 23. In this case, the information medium 23 may be arranged, for example, on the reel 10. Further, the control method 200 comprises performing 203 a response action in response to the irregularity 12 when a position of the web material 11 is reached based on the correlation of the irregularity 12 to the running parameter 13 by unwinding the web material 11. In particular, the response action can comprise cutting out the irregularity 12 with a portion of the web material 11, as shown in FIG. 7d. As a result, defective material can be removed and thus the process with the non-defective material can be processed further. Additionally or alternatively, stopping the unwinding device 2 may be provided as a response action. Further, the control method 200 may comprise visualizing 204 the correlation between the irregularity 12 and the current running parameter 13 at the unwinding device 2, as shown in FIG. 7e. This can comprise, for example, displaying the irregularity 12 to the running parameter 13 on a display 61, so that the assignment of the irregularity 12 to the running parameter 13 is unambiguous. This allows the operator to see the correlation and possibly adjust the operation in the unwinding device 2. Furthermore, in the context of the exemplary embodiment of the control method 200, as shown, obtaining 205 a material composition 17 of the web material 11 and obtaining 206 a relative position 18 of the web material to a reference position on the reel 10. This can be performed in particular simultaneously with obtaining 201 the correlation between the irregularity 12 and the running parameter 13, as shown in FIG. 7b. As a result, further parameters can be provided to the unwinding process in order to be able to better perform this process and/or to better handle the reel 10. In particular, with the control method 200 and/or individual method steps of the control method 200, a quantification method for determining a number of products produced from the web material 11 can also be performed.

FIG. 8 further shows a processing method 300 for performing a process of processing a web material 11, wherein performing a monitoring method 100 is provided in which a winding process is monitored. In this case, a correlation between an irregularity 12 and a running parameter 13 with respect to a reel 10 is provided and transmitted to an unwinding device 2 according to a method step 301. This may comprise, for example, storing on an external server 42. The monitoring method 100 may preferably correspond to the monitoring method of FIG. 4 or FIG. 5. After the transfer 301 of the correlation, a control method 200 is furthermore performed for performing an unwinding process on the unwinding device 2. The control method 200 can preferably be performed according to the exemplary embodiment of FIG. 6 or 7. Thereby, the entire supply chain between winding a web material 11 and unwinding a web material 11 can be improved, since both processes have relevant data, in particular wherein the winding process can provide the unwinding process with data useful in handling a particular reel 10.

FIGS. 9a to 9c show further types of irregularities 12. Thus, FIG. 9a shows, for example, the formation of a tearing in the web material 11, which can be optically detected by a detection unit 20. Thus, for example, a certain length of a tearing may be tolerable and, as of a certain length of the tearing, it may be classified as an irregularity 12. FIG. 9b also shows another possible irregularity 12, wherein a driving means 50 comprises drive rolls 51, which provide a propulsion 11.1 of the web material 11. If it is determined by a detection unit 20, for example, that an advance parameter 51.1 deviates from a desired value, increased slip on the drive rolls 51 can be detected, so that an irregularity 12 is defined. The slip can be e.g. a difference between an actual propulsion of the web material 11 and the advance parameter 51.1. FIG. 9c further shows an opening of a film tube, wherein the web material 11 is provided at least in a middle region in two layers, which are connected to the outer sides of the web material 11. In order to bring the web material 11 in the form of a tube, it may be provided that suction means 52 each suck in and pull apart a surface of the web material 11, so that the tube is formed from the previously flat web material 11. By certain events within the process, it may happen that a suction force is not sufficient and the web material 11, for example, has blockings. As a result, it may not be possible by the suction means 52 to open the web material 11 at a certain position, wherein several suction attempts may be provided here. Several suction attempts can also be classified as an irregularity and reported to a computing unit 30. Thus, for example, a force measurement of the suction means 52 may be provided by the detection unit 20, wherein at an increased force or at a sudden drop in force this can be detected as an irregularity by the computing unit 30.

The above explanation of the embodiment describes the present invention solely by way of examples. Of course, individual features of the embodiment, if technically reasonable, can be freely combined without departing from the scope of the present invention. In particular, a quantification method for determining a number of products produced from a web material can also be combined with individual or all features of the embodiments, if technically reasonable.

LIST OF REFERENCE SIGNS 1 winding device
2 unwinding device
3 processing system
4 production unit
10 reel
10.1 reel sleeve
10.2 rotation
10.3 winding start
10.4 winding end
11 web material
12 irregularity
13 running parameter
15 return parameter
16 parameter range
16.1 first parameter limit
16.2 second parameter limit
17 material composition
18 relative position
20 detection unit
21 measuring unit
22 position detection unit
23 information medium
24 measuring unit
30 computing unit
31 communication interface
32 control unit
33 communication interface
40 database
42 external server
43 mobile storage unit
50 driving means
51 drive roll
52 suction means
53 driving means
60 output unit
61 display
62 light source
63 loudspeaker
70 reel holder
71 sleeve holder
80 reference interface
81 providing unit
100 monitoring method
101 at least partially winding
102 detecting of 12
103 determining a correlation
104 providing the correlation
104.1 entering the irregularity
104.2 generating of 23

104.3 visualizing the correlation
105 providing a material composition
106 providing a relative position
200 control method
201 obtaining a correlation
201.1 reading out from 40
201.2 reading out of 23
202 at least partially unwinding
203 performing a response action
204 visualizing the correlation
205 obtaining a material composition
206 obtaining a relative position
300 processing method
301 transfer

The invention claimed is:

1. A monitoring method for monitoring a winding process on a winding device, comprising the following steps:
   at least partially winding a web material into a reel during the winding process,
   detecting at least one irregularity of the web material,
   determining a correlation between the irregularity and at least one running parameter of the reel, and
   providing the correlation between the irregularity of the web material and the running parameter of the reel for an unwinding process on a form, fill and seal (FFS) machine to produce sacks from the web material and determine a number of sacks produced from the web material based on the running parameter and the at least one irregularity of the web material, wherein a response action in response to the irregularity is performed when a position of the web material is reached based on the correlation between the irregularity and the running parameter upon unwinding of the web material,
   wherein the providing the correlation between the irregularity and the running parameter comprises the following step:
   generating a reel-specific information medium which is arranged on the reel and comprises the correlation between the irregularity and the running parameter,
   wherein the web material comprises a plastic film, and
   wherein the irregularity comprises at least one of the following features:
      unsuccessful opening of a tube of the web material,
      at least partial tearing of the web material,
      absence of a printed image on the web material,
      increased slip on a driving means during winding of the web material,
      changed torques and/or forces during the winding of the web material,
      blocking in the web material, where the web material is a tubular web material,
      temporary deviation from a production formulation of the web material, and
      exceeding or falling below specifications of physical characteristics of the web material.

2. The monitoring method according to claim 1, wherein the running parameter of the reel is determined during the winding of the web material.

3. The monitoring method according to claim 1, wherein the running parameter is determined by detecting an advance parameter of the web material.

4. The monitoring method according to claim 1, wherein the providing the correlation between the irregularity and the running parameter comprises the following step:
   entering the correlation between the irregularity and the running parameter in a database.

5. The monitoring method according to claim 4, wherein the entering the correlation between the irregularity and the running parameter in the database comprises an access to at least an external server or a mobile storage unit.

6. The monitoring method according to claim 1, wherein the providing the correlation between the irregularity and the running parameter comprises the following step:
   visualizing the correlation between the irregularity and the running parameter on the winding device.

7. The monitoring method according to claim 1, wherein the monitoring method further comprises at least one of the following steps:
   providing a material composition of the web material, and
   providing a relative position of the web material to a reference position on the reel.

8. A control method for performing an unwinding process on an unwinding device, comprising the following steps:
   at least partially unwinding a web material from a reel during the unwinding process,
   obtaining a correlation between an irregularity of the web material and at least one running parameter of the reel from a winding process, and
   performing a response action in response to the irregularity, when a position of the web material is reached based on the correlation between the irregularity and the running parameter upon unwinding of the web material,
   wherein the obtaining the correlation between the irregularity and the running parameter comprises the following step:
   reading out a reel-specific information medium which is arranged on the reel and comprises the correlation between the irregularity and the running parameter by a detector of a reference interface,
   wherein the web material comprises a plastic film,
   wherein the response action comprises at least one of the following actions:
      interrupting the unwinding process,
      changing a speed of unwinding the web material,
      changing of processing parameters,
      suspending individual processing steps, and
      adding individual special processing steps,
   wherein the unwinding device comprises a form, fill and seal (FFS) machine and is adapted to produce sacks from the web material, and
   wherein a number of sacks produced from the web material is determined based on the running parameter and the irregularity of the web material.

9. The control method according to claim 8, wherein the obtaining the correlation between the irregularity and the running parameter comprises the following step:
   reading out the correlation between the irregularity and the running parameter from a database.

10. The control method according to claim 9, wherein the reading out the correlation between the irregularity and the running parameter from the database comprises an access to at least an external server or a mobile storage unit.

11. The control method according to claim 8, wherein the control method comprises the following step:
   visualizing the correlation between the irregularity and the running parameter on the unwinding device.

12. The control method according to claim 8, wherein a return parameter of the reel is determined during the at least partially unwinding of the web material, wherein the return parameter is related to the running parameter.

13. The control method according to claim 8, wherein the response action comprises at least cutting out a portion of the web material in a region of the irregularity or wherein the response action comprises stopping the unwinding device.

14. The control method according to claim 8, wherein the position of the running parameter is determined by detecting an advance parameter of the web material.

15. The control method according to claim 8, wherein the control method further comprises at least one of the following steps:
obtaining a material composition of the web material, and
obtaining a relative position of the web material to a reference position on the reel.

16. The control method according to claim 8, wherein a number of products produced from the web material is determined based on at least the running parameter or the return parameter.

17. The control method according to claim 8, wherein the unwinding device has at least one folding device for folding the sacks, wherein the folding device comprises a guiding device through which the web material can be conducted during propulsion, so that a sack shape is formed at least partially from the web material.

18. The control method according to claim 8, wherein at least the interrupting the unwinding process is configured to allow an operator to access the unwinding device, the changing of the speed of unwinding the web material is configured to gain additional time, the changing of the processing parameters includes an adjustment of a welding temperature for sacks subsequently produced from the web material, the suspending of individual processing steps includes suspending of at least one of welding, filling and stretching of the web material, or the adding of individual special processing steps includes at least one of marking the web material at the position of the irregularity, ejection of sorted material, and removal of sorted material.

19. An unwinding device for performing an unwinding process of a web material of a reel, comprising:
a reel holder on which the reel can be stored during the unwinding process;
a reference interface for obtaining a correlation between an irregularity of the web material and at least one running parameter of the reel from a winding process; and
a position detector by which an unwinding of the web material can be monitored during the unwinding process, so that a response action in response to the irregularity is performed, when a position of the web material is reached based on the correlation between the irregularity and the running parameter in the unwinding process,
wherein:
the reference interface comprises a detector for reading out a reel-specific information medium which is arranged on the reel and comprises the correlation between the irregularity and the running parameter,
the web material comprises a plastic film,
the response action comprises at least one of the following actions:
interrupting the unwinding process,
changing a speed of unwinding the web material,
changing of processing parameters,
suspending individual processing steps, and
adding individual special processing steps,
the unwinding device comprises a form, fill and seal (FFS) machine and is adapted to produce sacks from the web material, and
the position detector is configured to determine a number of sacks produced from the web material based on the running parameter and the irregularity of the web material.

* * * * *